United States Patent [19]

Heine et al.

[11] Patent Number: 4,795,403
[45] Date of Patent: Jan. 3, 1989

[54] TORSIONAL SLEEVE COUPLING

[75] Inventors: Charles F. Heine, New Haven; Mark C. Barnholt, Ft. Wayne; Donald E. Hobson, Leo; Richard L. Pifer, Ft. Wayne, all of Ind.

[73] Assignee: Dana Corporation, Toledo, Ohio

[21] Appl. No.: 900,021

[22] Filed: Aug. 25, 1986

[51] Int. Cl.$^4$ .............................................. F16D 3/10
[52] U.S. Cl. ..................................... 464/77; 464/160; 464/180
[58] Field of Search ................ 267/164; 180/247; 403/326, 359; 464/51, 77, 100, 101, 160, 161, 180

[56] References Cited

U.S. PATENT DOCUMENTS

| | | | |
|---|---|---|---|
| 1,636,262 | 7/1927 | Troendly | 464/51 |
| 1,956,798 | 5/1934 | Janssen | 464/63 |
| 1,957,114 | 5/1934 | Spase | 464/60 |
| 1,997,021 | 4/1935 | Spase | 464/77 |
| 2,263,113 | 11/1941 | Wichorek et al. | 464/77 |
| 2,340,149 | 1/1944 | Slack . | |
| 2,616,274 | 11/1952 | Landrum | 464/160 X |
| 2,691,283 | 10/1954 | Stover | 464/180 X |
| 2,776,556 | 1/1957 | Gustafson et al. | 464/97 |
| 2,806,365 | 9/1957 | Hennig | 464/83 X |
| 2,884,101 | 4/1959 | Warn . | |
| 2,895,315 | 7/1959 | Fishtahler | 464/180 X |
| 3,055,471 | 9/1962 | Warn et al. . | |
| 3,062,023 | 11/1962 | Stolworthy | 464/97 |
| 3,138,943 | 6/1964 | Gustke | 464/97 |
| 3,155,187 | 11/1964 | DeLorean | 464/180 X |
| 3,252,301 | 5/1966 | Herrington, Jr. | 464/88 |
| 3,320,771 | 5/1967 | Roethlisberger et al. | 464/91 |
| 3,408,830 | 11/1968 | Sutaruk et al. | 464/180 X |
| 4,244,242 | 1/1981 | Uno et al. | 74/710 |
| 4,406,640 | 9/1983 | Franklin et al. | 464/89 X |
| 4,573,723 | 3/1986 | Morita et al. | 464/77 X |
| 4,598,677 | 7/1986 | Mongin et al. | 403/359 X |

FOREIGN PATENT DOCUMENTS

| | | | |
|---|---|---|---|
| 168624 | 7/1951 | Australia | 464/77 |
| 513182 | 5/1976 | U.S.S.R. | 464/160 |
| 1132649 | 11/1968 | United Kingdom | 464/77 |

Primary Examiner—Daniel P. Stodola
Attorney, Agent, or Firm—F. B. McDonald

[57] ABSTRACT

A torsional sleeve coupling provides a spring system for dampening torsional vibrations in a driveline coupling during low torque modes of operation. In a preferred form, the coupling is adapted for use with a driving and a driven shaft which are coaxially aligned. The coupling includes a lost motion connection for torsionally coupling the driven and driving shaft ends for joint rotation. In a preferred embodiment, the coupling incorporates a sleeve which contains a C-spring having an annular metallic body positioned in coaxial registration with one of the shafts. The spring includes a pair of spaced, radially oriented ears. The sleeve and the shaft about which the spring is positioned each contain a slotted portion. The two slotted portions are in radial alignment with each other, and each is adapted to receive both of the ears of the spring.

6 Claims, 2 Drawing Sheets

TORSIONAL SLEEVE COUPLING

BACKGROUND OF THE INVENTION

This invention relates to torsional sleeve couplings. More particularly, the invention relates to a novel spring dampening system for absorbing torsional vibrations generated in a driveline assembly.

There are a number of prior art systems designed and adapted for absorbing driveline vibrations of the type common in vehicular applications. A major source of such vibration exists between the pinion shaft gears and the ring gear of a differential within the driveline assembly during non-driving, low torque range modes of operation. Thus, for example in an "all-wheel" drive vehicle being driven selectively only by the front wheels, the rear wheels will "coast", and the differential pinion shaft will be back-driven by the differential ring gear. During such back-driven rotation of the pinion gear, the differential ring gear teeth will typically chatter against the pinion gear teeth, resulting in transmission of vibration throughout the driveline assembly components. Several prior art systems designed to accommodate this non-driving mode phenomenon provide workable, but unsatisfactory solutions. Most of the existing systems are cumbersome to manufacture, expensive to fabricate and install, and/or have severe operating limitations.

For example, several designs utilize a torsional coupling sleeve with rubber to provide a dampening effect. To the extent that the spring rate of rubber is highly temperature sensitive, the latter systems are relatively useless in extremely cold weather.

What is needed is an inexpensive, easily fabricated, simple to install torsional sleeve coupling system which will provide a satisfactory torsionally dampened performance of a driveline coupling during the non-driving mode of the driveline under virtually all practical limits of operation.

SUMMARY OF THE INVENTION

The invention herein described provides a torsional sleeve coupling apparatus capable of satisfactorily dampening a driveline shaft connection during a non-driving mode. In one preferred form, the driveline includes coaxial driving and driven shafts, and a torsional sleeve coupling which provides a lost motion connection for one of the shafts and a rigid connection for the other. The lost motion connection includes a C-spring for dampening torsional vibrations, the spring having a body of a rectangular cross-section substantially describing an annulus positioned in coaxial registration with one of the shafts. The spring includes a pair of spaced, radially oriented ears. The coupling and the one shaft encircled by the spring each contain a slotted portion positioned in radial alignment with the other, each of the slotted portions being adapted to receive both of the radially oriented ears.

In accordance with the invention, the lost motion connection is only with respect to one of the shafts, and a rigid coupling connection is made with the other. At a threshold torque value, each of the ears is resiliently loaded against spaced walls of each slotted portion of the coupling and the slotted shaft. Above the threshold torque value, one of the ears is in constant contact with only one of the walls of the slotted portion, while the other of the ears is in contact with the opposing wall of the other of the slotted members. The coupling therefore provides a low torque range back-driven connection as well as a high torque range positive driving connection. The low torque connection affords a resilient coupling for absorbing, hence isolating, vibration from the driveline, while the high torque connection provides a positive nomal load driving connection.

DETAILED DESCRIPTION OF PREFERRED EMBODIMENTS

Figure 1:
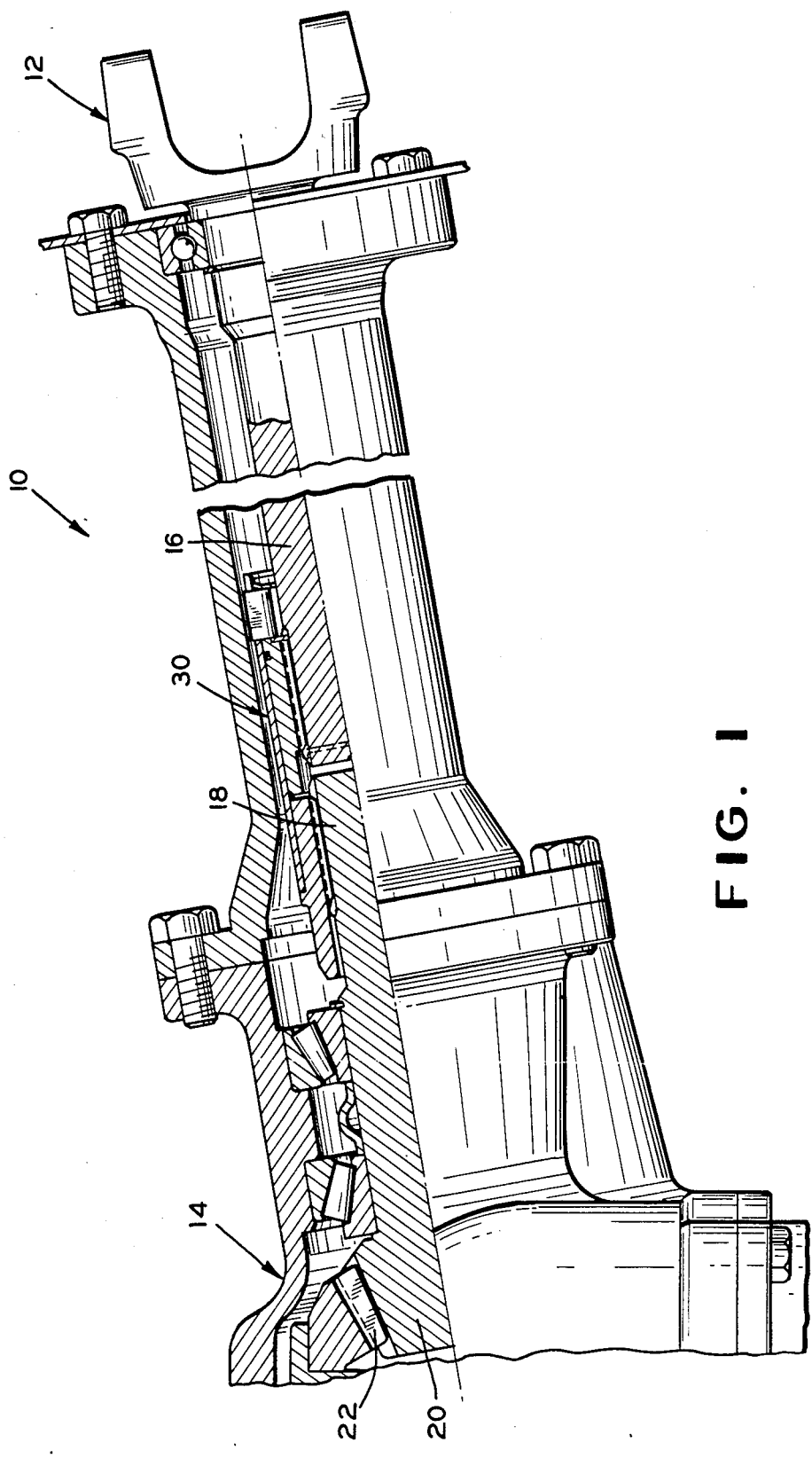
FIG. 1 is a fragmentary view of a vehicular driveline which incorporates one preferred embodiment of the torsional sleeve coupling apparatus of the present invention.

Referring initially to FIG. 1, a vehicular driveline assembly 10 is shown. The assembly 10 includes a driveline input yoke 12 coupled to a differential gear box 14 (shown fragmentarily) through a driving input shaft 16 and a driven pinion shaft 18. The pinion shaft 18 includes a pinion gear 20 at its free end which is in mesh with a ring gear 22 for driving a set of differential axle gears, not shown. The input shaft 16 and pinion shaft 18 are coupled by a torsional sleeve coupling 30, which represents one preferred embodiment of the present invention.

Figure 2:
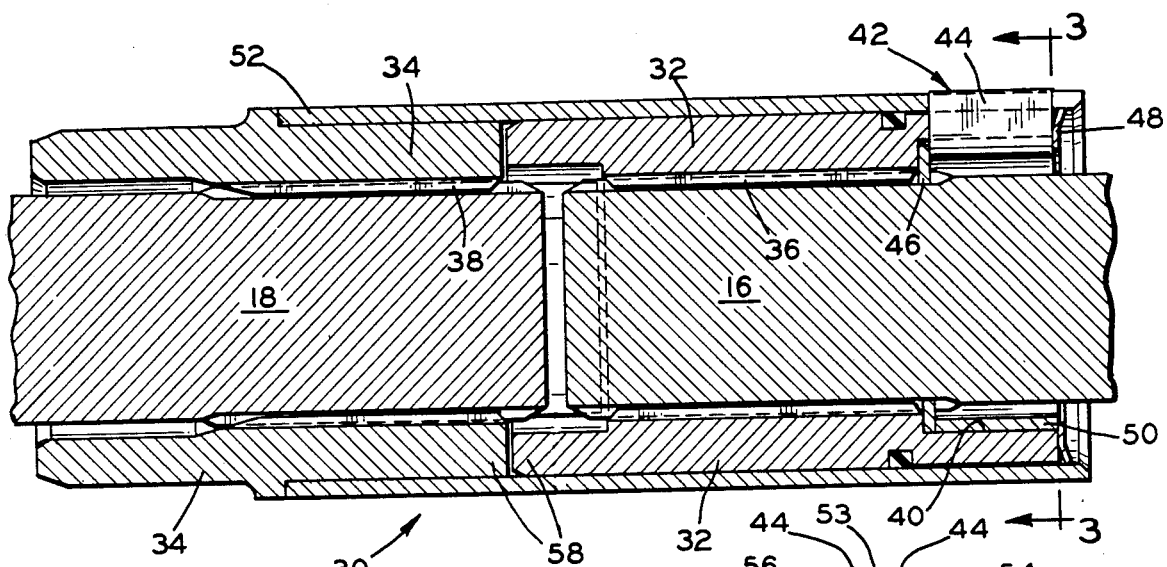
FIG. 2 is an enlarged cross-sectional view of the torsional sleeve coupling utilized in the driveline apparatus of FIG. 1.
Figure 3:
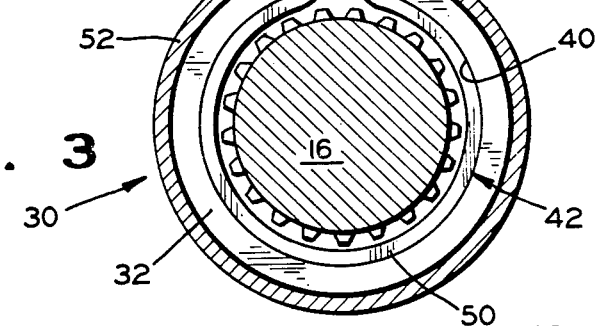
FIG. 3 is a cross-sectional end view of the torsional coupling of FIG. 2, shown along lines 3—3 thereof.

Referring to FIGS. 2 and 3, an enlarged view of the torsional sleeve coupling 30 is presented. The coupling 30 includes an input sleeve 32 which is splined to the driving input shaft 16, and also includes a pinion sleeve 34 which is splined to the driven pinion shaft 18. Input splines 36 provide a rigid driving coupling connection between the input sleeve 32 and the shaft 16. Pinion splines 38 provide a rigid connection between the pinion sleeve 34 and the pinion shaft 18. A pinion extension sleeve 52 is secured either by a welded or a press fit connection to the pinion sleeve 34, and loosely engages the input sleeve 32.

In this first preferred embodiment, a counterbore 40 is formed as part of the input sleeve 32, and contains a C-spring 42. Referring more particularly to FIG. 3, the spring has an annular body portion 50 which extends circumferentially about the input shaft 16. A pair of spaced ears 44 extend radially of the body portion 50, through a slotted aperture 53 formed by a pair of aligned slots, one slot within the extension sleeve 52 and the other within the input sleeve 32. The spring 42 is axially fixed within the counterbore 40 by means of a lock washer 46 and a spring washer 48, each positioned as shown in FIG. 2. The annular body portion 50 of the spring 42 extends axially about a portion of the input shaft 16, with the ears 44 thereof protruding radially outwardly through the aforedescribed slotted aperture 53. Each of the ears contacts an extension sleeve detent 54 on either side of the extension sleeve slot, and an input sleeve detent 56 on either side of the input sleeve slot. The detents are defined by the extremities of the input and extension sleeve slots.

The input and pinion sleeves 32 and 34 each have mating axially extending dog clutch teeth 58 which provide a "lost motion" connection between shafts 16 and 18. The lost motion connection is required for establishing a dual torque range capability in the torsional sleeve coupling 30. The spring 42 will absorb gear teeth vibrations during the times that the driveline assembly 10 (FIG. 1) is backdriven. The relatively low spring rate force of the spring 42 (as further specified hereinbelow) will be overcome by the higher torques required to operate the driveline assembly under normal positive driving conditions.

It will thus be appreciated by those skilled in the art that the inherent freedom of movement resulting from the lost motion connection provided by the dog clutch teeth 58 will be taken up by the spring ears 44, which are normally spring loaded apart from each other in the free state. Thus as shown in FIG. 3, each spring ear 44 will in the described preferred embodiment be spring loaded against opposite pairs of detents 54 and 56.

Figure 4:
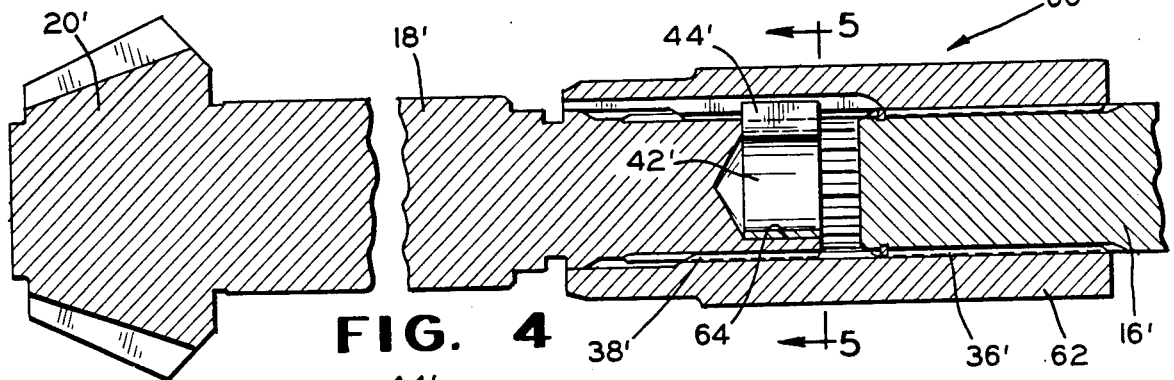
FIG. 4 depicts a second preferred embodiment of a torsional sleeve coupling designed in accordance with the present invention.
Figure 5:
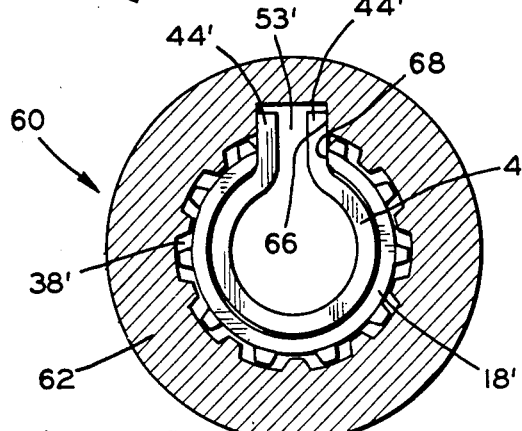
FIG. 5 is a cross-sectional end view of the coupling of FIG. 4, shown along lines 5—5 thereof, during a low torque range driveline mode.
Figure 6:
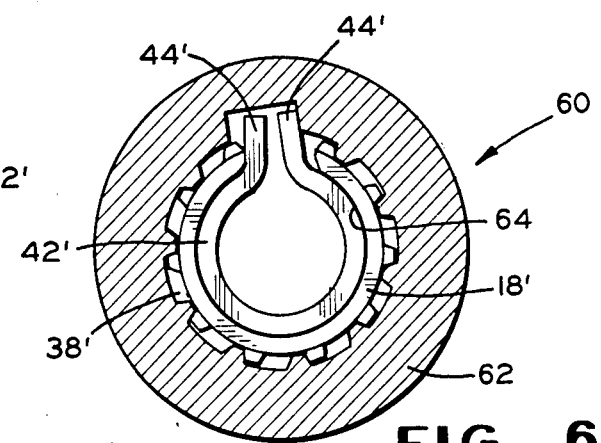
FIG. 6 is an end view similar to FIG. 5, but depicted in a high torque range mode.

Referring now to FIGS. 4 through 6, a second preferred embodiment of the torsional sleeve coupling of the present invention is shown. In this embodiment only one coupling sleeve 62 is provided, as contrasted with the dual coupling sleeves 32 and 34 of the previously described embodiment. In the second preferred embodiment a counterbore 64 is provided in the coupling end of the pinion shaft 18'. Referring specifically to FIG. 5, it will be seen that the slotted aperture 53' of the second preferred embodiment is provided in the coupling sleeve 62 and the counterbore portion 64 of the pinion shaft 18'. Hence, the ears 44' of the spring clip 42' extend into the slotted aperture 53' and make spring loaded contact with the coupling sleeve detents 66 and pinion shaft detents 68, respectively, which are analogous to the detents 54 and 56 of the previously described embodiment. However, it will further be noted that although the input splines 36'0 of the second preferred embodiment provide for a normal splined rigid connection, the pinion splines 38' of the second preferred embodiment provide a lost motion connection by affording excessive backlash. Thus, the lost motion feature is provided in a splined connection of a unitary sleeve coupling, rather than in dog clutch teeth of a dual sleeve coupling as in the first embodiment. In all other respects, the first and second preferred embodiments are similar.

The operation of the torsional sleeve couplings 30 and 60 of the present invention will now be described with specific reference to the torsional sleeve coupling 60. FIGS. 5 and 6 show the relative positions of spring ears 44' under both low torque (FIG. 5) and high torque (FIG. 6) conditions. It will be appreciated by those skilled in this art that the spring 42' is necessarily associated with the lost motion portion of the splined sleeve coupling as contemplated in the present invention, regardless of whether the spring is operative with either the driven or the driving shaft member. Thus, the spring 42, 42' is designed to resist the tendency for lost motion, which in this specific environment is generated by vibration between the driving and driven members. To the extent that FIGS. 5 and 6 depict only the second preferred embodiment, all specific descriptions of operation are related to the latter embodiment. Those skilled in the art will be able to relate the description hereof to the operation of first preferred embodiment of FIGS. 2 and 3, as well.

Referring momentarily back to FIG. 1, whenever the driving shaft 16 is backdriven through the rotation of the differential ring gear 22, the torque will be relatively low. To the extent that such a backdriven load is not a driving load, but rather either a "following" or a "coasting" load, rotation of the rear wheels will drive the ring gear 22 of the differential axle gear box 14, in turn driving the pinion shaft 18. As the coupling 60, (referring back to FIGS. 4 and 5) provides a driving connection between pinion and input shafts, the normally driven shaft 18' will drive the shaft 16' in the backdriving mode. During this mode the ring gear teeth will typically chatter against the teeth of the pinion gear 20', causing vibrations in the form of an audible "rumble" through the driveline assembly. The spring 42' and lost motion splines 38' operate to absorb these vibrations, as shown in FIG. 5.

Referring now to FIG. 6, the lost motion coupling will also establish a driving connection for high torque coupling between the driving and driven elements 18' and 62 as required under normal driving conditions. As shown in FIG. 6, the splines 38' of the coupling 62 will directly engage the mating splines 38' of the pinion shaft 18', thus overcoming the relatively low rate spring force associated with the spring 42'. In the latter position it will be seen that only one of the ears 44' will be in contact with only one of the detents 66 of the coupling sleeve, while the other of the ears 44' will be in contact with the pinion shaft detent 68 of the pinion shaft 18'. This is to be contrasted with the low torque range condition depicted in FIG. 5, wherein under a threshold torque value, each of the ears 44' is resiliently loaded against both of the coupling sleeve and pinion shaft detents 66 and 68, respectively.

In prototypes of both preferred embodiments, the high torque load capability was five thousand (5,000) inch-pounds, and a spring rate range of from one (1) inch-pound per degree to ten (10) inch-pounds per degree was required to prevent driveline vibration rumble. A lost motion angle in the range of 3 to 5 degrees was utilized. Obviously, the low rate spring is easily deflected for establishing a positive driveline connection.

Although only two preferred embodiments of the present invention have been shown and described herein, the appended claims are envisioned to cover numerous other embodiments not specifically detailed herein.

What is claimed is:

1. In combination: (1) a driveline coupling apparatus comprising a driving shaft, a driven shaft coaxially and matingly aligned therewith, both shafts containing splines at the mating ends thereof, a first sleeve splined to said driving shaft, a second sleeve splined to said driven shaft, said first and second sleeves comprising axially extending lost motion coupling means between said driving and driven shafts, said second sleeve comprising a third sleeve fixed to said second sleeve and extending circumferentially about said first sleeve, and (2) means for dampening torsional vibration between said driving and driven shafts comprising a counterbore in said first sleeve, a slotted aperture defining aligned sides in said first and third sleeves, wherein said aligned sides comprise interacting detents on said first and third sleeves, a C-spring positioned within said counterbore, said C-spring extending circumferentially about said driving shaft, said C-spring defining a pair of radial ears extending through said slotted aperture, said ears adapted for selective contact with said detents of said first and third sleeves, whereby in a first rotational mode of said driveline, said axially extending lost motion coupling means is positively engaged, and said ears of said C-spring are constantly urged together by said detents of said first and third sleeves, during which mode there is no lost motion between said driving and driven shafts, and whereby in a second rotational mode of said driveline, said coupling means is subject to lost motion, and said C-spring ears are disposed for absorbing torsional vibration between said driven and driving shafts.

2. The combination of claim 1 where said first and second rotational modes of said driveline correspond to first and second coupling torque ranges, wherein said first rotational mode has a first coupling torque above a predetermined threshold value, and wherein said second rotational mode comprises a second coupling torque range below said predetermined threshold value, whereby said coupling apparatus is subject to lost motion only in said second coupling mode.

3. The combination of claim 2 wherein said pairs of detents of said first and third sleeves are positioned in radial alignment, each detent adapted to contact one of said ears.

4. The combination of claim 3 wherein said driveline is in said first rotational mode whenever one of said ears of said C-spring is in contact with only one detent of one of said pairs of detents, and the other of said ears is in contact with the opposing detent of the other of said pairs of detents.

5. The combination of claim 4 wherein said ears of said C-spring are maintained under constant circumferential load by said dents.

6. The combination of claim 5 wherein said axially extending coupling means comprise mating dog clutch teeth on said first and second sleeves.

* * * * *